Feb. 25, 1969  TOSHIAKI TAKABAYASHI  3,429,726
METHOD OF PRODUCING CEMENT MORTAR OR CONCRETE
Filed Oct. 2, 1963 grinds under partial vacuum

Inventor
Toshiaki Takabayashi
by Michael S. Striker

United States Patent Office 3,429,726
Patented Feb. 25, 1969

3,429,726
METHOD OF PRODUCING CEMENT MORTAR OR CONCRETE
Toshiaki Takabayashi, No. 1 Sasazuka-3-chome, Shibuya-ku, Tokyo, Japan
Filed Oct. 2, 1963, Ser. No. 313,367
Claims priority, application Japan, Oct. 14, 1962, 37/45,546
U.S. Cl. 106—89            8 Claims
Int. Cl. C04b 7/52

Figure 1:
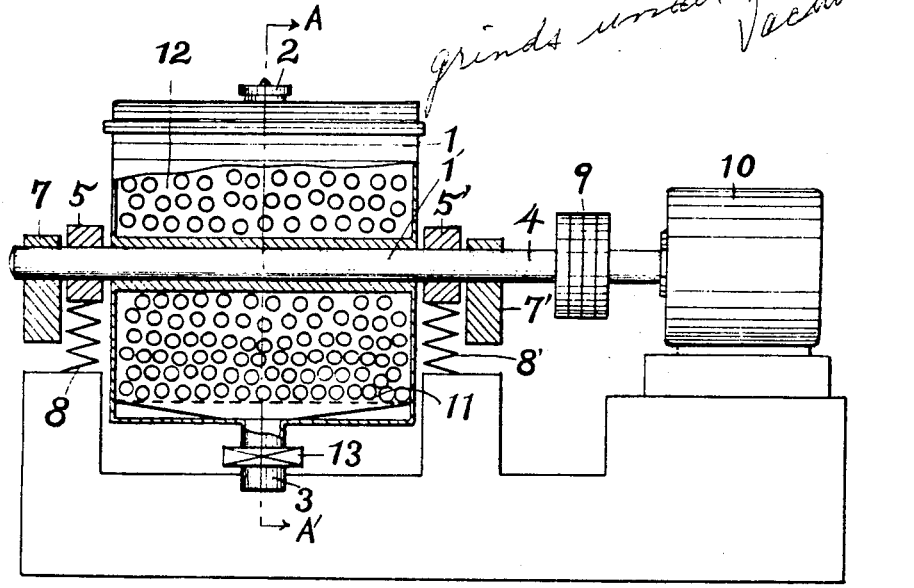
Figure 2:
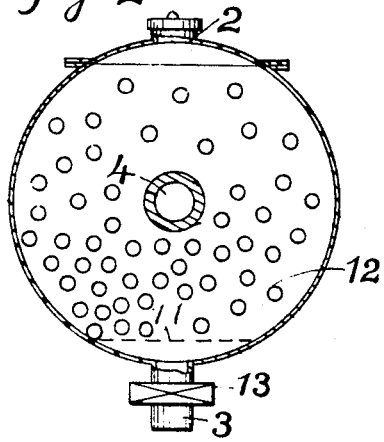

The drawing illustrates an example of a vibrating ball mill to be used in the carrying out the present invention. FIG. 1 is a vertical section of the ball mill, and FIG. 2 is a vertical section taken along the line AA' of FIG. 1.

In producing cement mortar or concrete, the method and apparatus in which so called hydraulic cement such as portland cement, silica cement, or blast furnace cement is mixed with water and stirred with shovel or mixer to produce first a cement paste, and then using the cement paste as basic material mixing aggregate therewith, instead of mixing and stirring all of these constituents simultaneously, are a matter of common knowledge. However, it is a fact that the mortar or concrete produced with either of such methods or apparatus described above can not generate a sufficient strength due to the fact that most of the cement particles left in the thus-formed mixture have non-hydrated portions remaining inside even after sufficient hardening has taken place.

This fact can be proven by crushing once hardened mortar or concrete after the lapse of many years and triturating the crushed mortar to a degree of fineness similar to that of ordinary cement particles, thereby exposing said non-hydrated interior portions, and mixing with water it will be found that it hardens to a strength of often 60 percent that of the original mortar or concrete.

It is caused chiefly by the manner of operation in the manufacturing steps and not always by the degree of fineness to which the cement particles are ground, that hydration occurs only on the surfaces of cement particles of cement mortar or concrete and that unhydrated portions are left inside of the cement particles after hardening has been completed.

For example, assuming the average diameter of the particles of commercial cement to be 20 micron, if it were to be ground exposed to air to such fineness as 10 micron, the surface area of the particles would increase by more that 8 times, i.e. at the same time the area of the film of air surrounding the particles and adhering to the same would correspondingly increase. On the other hand, since the weight of the particles will decrease to less than ⅛, even if water were added to and stirred, the presence of said air film will not easily allow wetting of the particles.

It is an inevitable fact that the particles which are partly hydrated will harden, joining with the adjacent particles to form a microscopic cavity in their center around which are located non-hydrated portions, thereby impeding increase in the strength of the product.

In other words no matter how finely the cement particles are ground, the complete hydration and subsequent increase of strength can not be attained, unless the air clinging around the particles is removed and replaced by water.

Hitherto, there have been some improvements in this line on the production of mortar or concrete (i.e., Japanese Patent No. 113,512 or publication No. of patent specification 3682/1935). This process consists in removing the air film clinging around cement particles which had been previously triturated to a superior degree of fineness, by means of a jet of steam, and simultaneously obtaining a slime having strongly hardening property by having such particles as nuclei, surrounded by the condensed water from said steam, and then making mortar or concrete using such slime as the basic material.

This undoubtedly is an improved process, however, since steam must be used, it not only involves increased expenses with respect to the equipment but also necessitates skill in its operation, thereby markedly limiting the extent of application of this method.

The object of this invention is to provide a method by which cement mortar or concrete of a higher strength than could be practically achieved up to now, can be manufactured in a very short time by using conventional materials and simply improving the mechanical operating conditions.

It is obvious that the greater the strength of mortar or concrete the more useful it will be. But if it takes a long time to attain such great strength, the industrial advantages will decrease considerably, because in manufacturing output per unit of space will be greatly reduced, while at the construction site the working efficiency will be seriously injured by the prolongation of the curing period. To summarize: the concept of the present invention is to utilize vacuum and to triturate the cement particles to a ultra fineness under vacuum and also in the presence of water, completely abolishing grinding of the cement particles in contact with air. Here the term "under vacuum" and "in the water" mean a condition where no appreciable amount of air is present. And the meaning of "triturate to an ultra fineness" is to generate new fresh surfaces on the cement particles, rather than to diminish the diameter of the particles, under the condition of absence of air and presence of water. This can be easily understood from the fact that however fine the degree of trituration may have been which is attained in contact with air, an increase of the strength at the same rate can never be obtained.

According to the present invention, since the operation is conducted as mentioned above, fresh surfaces are generated one after another on the cement particles by finely trituration. Moreover since this happens in water insulated from the air, such newly generated surfaces readily adhere to the molecules of water and an active hydrating reaction starts and goes on from that instant.

To bring the materials into the conditions mentioned above, a triturating machine is required which must be so constructed as to permit not only trituration of the cement particles to a desired fineness as quickly as possible and in presence of a large amount of water, but which also must be suitable for working under vacuum.

For this purpose, a common ball mill working in accordance with the principle where the grinding is effected by steel balls dropping inside of a rotating drum is useless, because it is not effective, no matter how long it will be operated. High swing ball mills of the type of Banthold Sichert GmbH, Germany, having four drums each of which holds steel balls inside and rotates and revolves when driven by a common shaft, is also inconvenient for vacuum operation though it is suitable for triturating cement in water. I prefer and have presently ascertained after a series of tests that the vibrating ball mill (Vibratum) manufactured by Siebtechnik GmbH, Mulheim, Ruhr, Germany, is only one machine suitable for this purpose.

That is to say, it is possible by operating said machine for about 20 to 60 minutes under suitable conditions to increase the relative surface area of the cement particles in the slurry fed into the machine to between 4,500 sq. cm./g. and 12,000 sq. cm./g. measured by Blaine method. Further, since the drum merely vibrattes and does not rotate, if is most convenient for vacuum operation by connecting the top of the drum to a vacuum pump by using a rubber tube connection.

The accompanying drawing illustrates the construction briefly. 1 is a cylindrical drum having an inlet 2 for materials at the top and a discharge outlet 3 at the bottom. At the central part of this drum there is fixed a cylindrical tube 1' supported upon a rotatable shaft 4. 5 and 5' being bearings for the shaft 4, are supported similarly upon springs 8 and 8' respectively. 7 and 7' are weights fixed firmly upon the shaft 4. Since these weights are fixed eccentrically, vigorous vibrations both in vertical and horizontal directions of the shaft 4 and also the drum 1 supported on the shaft 4 are generated when the shaft 4 rotates. Consequently the steel balls enclosed in the drum are forced to strike the inner walls and also against each other, thereby triturating the cement particles caught in between by impact. 9 is a slip joint like an Oldham coupling, 10 an electric motor, 11 a screen and 12 the steel balls.

When this machine is used for trituration under vacuum in water, the top of the drum is connected to a vacuum pump with a rubber tube as already stated. Furthermore, the drum is conveniently connected by means of a valve to a water tank for feeding water at any time desired. Further, as the drum is closed tightly during operation, the vacuum pump is merely required to maintain a specified degree of vacuum, after a small amount of air remaining in the space left in the drum has been extracted, so that the power consumed by the vacuum pump will be very small.

It is preferable to use a vacuum as close as possible to the perfect vacuum (it is 760 mm. by vacuum gauge). But in practice it is possible up to 750 mm. to say strictly, which corresponds to the pressure of saturated steam at 11° C., i.e., a residual pressure of 10 mm. Hg. Accordingly, if the temperature rises during operation, it is recommended to cool the drum from the outside by means of cold air or jets of water to maintain the machine and the contents at a relatively low temperature.

If the operation of the present invention were to be explained by way of an actual example, at first the hydraulic cement powder together with additive material such as gypsum is fed into the vibrating ball mill as explained above, and the air remaining in the upper space in the drum is extracted by starting the vacuum pump. This takes about 5 minutes. Next the greater part of the total water present, for example as much as 55 percent in case of total amount of combining water be (W/C is equal to) 65 percent by weight, where 10 percent being reserved for regulating the quantity of water afterward, is fed into the machine utilizing the difference of the pressure, i.e., the subatmospheric pressure maintained in the machine, and thereafter continuous running of the machine for about 20 minutes will nearly finish the required trituration. Such operations as described above can all be done while the machine is running.

Now the reserved part of water, mentioned previously is added to get the prescribed value of the water cement ratio (W/C). And then by mixing the milky cement paste thus obtained by the above described operation with aggregate, mortar or concrete is finally made. It is also possible to carry out this mixing operation for making mortar or concrete under vacuum, further increasing the advantages of the invention.

The attached table shows the comparison in strength between the mortar made as described above and that made by the conventional method using the same material and mix. It can readily be seen from this table that the marked difference in the speed of hardening and the resulting strength depends on the manner of operation, though on the same material and mix.

It is obvious from the fundamental nature of this invention that the hydraulic cement to which this invention is to be applied includes portland cement, silica cement, blast furnace cement and such, and that a similar effect can be obtained also by starting the same operation with the clinkers or other basic materials of such hydraulic cement. Moreover, though the attached table shows the results obtained in the case of mortar, a similar effect can also be obtained in the case of making a concrete.

In short, since this invention is characterized by a method of making mortar or concrete wherein the cement paste is made at first and thereafter aggregate is added and mixed, by feeding together hydraulic cement or its basic material with some addition of necessary material into the machine such as vibrating ball mill, which utilizes the impact crushing force of steel balls directly enforced by the mechanical power, or a high speed and strong triturating machine of the same kind as mentioned above, and milky cement paste is made from the particles of the material which are finely triturated in water under vacuum and isolated from air, minor changes of details concerning the numerical values of mixing ratio, working pressure, duration or temperature, to the extent to which such changes do not deviate from the spirit of the invention, will not limit the rights of my invention.

TABLE

*Working example.*—Comparison of strength of mortar made with slurry obtained by finely trituration of cement particles for 20 minutes in the water and under vacuum using vibrating ball mill, in accordance with this invention.

| No. of test piece | Operation under vacuum, yes or no | | | | Bending strength, kg./cm.² by day | | | | Compression strength, kg./cm.² by day | | | |
|---|---|---|---|---|---|---|---|---|---|---|---|---|
| | Cement | Water pouring | Trituration | Mortar mixing | 1st | 3rd | 7th | 28th | 1st | 3rd | 7th | 28th |
| 1 | Yes | Yes | Yes | Yes | 53.5 | 63.9 | 73.2 | 82.0 | 221 | 335 | 470 | 481 |
| 2 | Yes | Yes | Yes | No | 52.1 | 63.0 | 70.2 | 73.4 | 215 | 330 | 461 | 475 |
| 3 | Yes | Yes | No | No | 52.0 | 62.7 | 68.6 | 70.1 | 210 | 296 | 435 | 460 |
| 4 | No | No | No | No | 47.9 | 53.7 | 65.5 | 68.0 | 205 | 281 | 420 | 450 |
| U | No | No | No | No | 19.3 | 37.2 | 48.5 | 67.5 | 59.4 | 146 | 241 | 442 |

(1) Degree of vacuum 750 mm. Hg by vacuum pump, i.e., 10 mm. Hg residual pressure.

(2) Time used for previous air extraction from cement powder by vacuum pump operation, 5 minutes.

(3) Time used for trituration in water under vacuum, 20 minutes.

(4) Combination ratio of water and cement, W/C=65% by weight; combination ratio of cement and sand, C/S=1:2 by weight.

(5) Number of days shows the curing age of mortar.

(6) U denotes common mortar made by a conventional method.

(7) Details of the vibrating ball mill being: drum—diameter 200 mm. x width 286 mm.; steel balls—diameter 12.5 mm., their weight 32 kg.; diameter 10.3 mm., their weight 8 kg.; total weight of steel balls 40 kg.

I claim:

1. A method of producing mortar and concrete of improved strength characteristics, comprising the steps of introducing hydraulic cement particles into a vibrating ball mill, thereafter forming a partial vacuum in said mill and, while maintaining said partial vacuum, introducing water into said mill; operating the water-containing ball mill so as to triturate said cement particles in the presence of water while maintaining said partial vacuum and to form an aqueous slurry of ground hydraulic cement particles having a particle size corresponding to a Blaine ratio of between about 4,500 and 12,000 cm.²/g.; and mixing the thus formed slurry with mortar- or concrete-forming aggregate.

2. In a method of producing solid bodies of improved strength characteristics and consisting at least partly of hydrated hydraulic cement, the steps of introducing hydraulic cement particles into a vibrating ball mill, thereafter forming a partial vacuum in said mill and, while maintaining said partial vacuum, introducing water into said mill; operating the water-containing vibrating ball mill so as to triturate said cement particles and to substantially increase the surface area per unit of weight of the thus formed hydraulic cement particles of reduced size under removal of at least the major portion of air from direct contact with the surfaces of said triturated cement particles, thereby improving direct contact between said water and said triturated cement particles, facilitating hydration of the latter; and forming a hardenable mass; and forming a solid shape-retaining body consisting at least partly of said hardenable mass in hardened condition.

3. A method as defined in claim 2, wherein said hydraulic cement is selected from the group consisting of portland cement and blast furnace cement.

4. A method as defined in claim 2, wherein cement clinkers are subjected to trituration.

5. A method as defined in claim 2, wherein a mixture consisting of hydraulic cement and of gypsum is subjected to said triturating.

6. A method as defined in claim 2, wherein said partial vacuum is equal to a residual pressure of the magnitude of 10 mm. Hg.

7. A method as defined in claim 2, wherein said triturating is carried out until the particle size of said hydraulic cement particles corresponds to a Blaine ratio of between 4,500 and 12,000 cm.$^2$/g.

8. A method as defined in claim 2, wherein said triturating is carried out for a period of between about 20 and 60 minutes.

References Cited

UNITED STATES PATENTS 3,151,995   10/1964   Nemeth _____ 106—89

FOREIGN PATENTS 13,957      1889     Great Britain.
328,030     4/1930   Great Britain.

OTHER REFERENCES

Creskoff, "Vacuum Concrete," The Canadian Engineer, Dec. 5, 1939, pages 4–8.

Lea and Desch, The Chemistry of Cement and Concrete, Edward Arnold Ltd., London, 1956, page 334.

Rippon, "Vacuum Processing of Shasta Dam Spillway," Engineering News Record, June 14, 1945, pages 93–96.

Lea and Desch, The Chemistry of Cement and Concrete, Edward Arnald Ltd., London, 1956, 2nd ed., pp. 314, 318, 319, 331, 334 and 335.

TOBIAS E. LEVOW, *Primary Examiner.*

S. E. MOTT, *Assistant Examiner.*

U.S. Cl. X.R.

106—97, 98